United States Patent [19]
Saiz

[11] Patent Number: 6,128,896
[45] Date of Patent: Oct. 10, 2000

[54] AIRCRAFT AIR CONDITIONER ENERGY RECOVERY DEVICE

[76] Inventor: Manuel Munoz Saiz, San Emilio 16, 1, 3, Madrid, Spain, 28017

[21] Appl. No.: 09/138,551

[22] Filed: Aug. 24, 1998

Related U.S. Application Data

[63] Continuation-in-part of application No. 09/092,725, Jun. 5, 1998, abandoned.

[30] Foreign Application Priority Data

Jan. 14, 1998 [ES] Spain ................................. P9800051
Jul. 20, 1998 [ES] Spain ................................. P9801535

[51] Int. Cl.[7] ................................. F02C 6/14; B64D 13/02
[52] U.S. Cl. ................................. 60/39.183; 60/39.07; 244/58; 454/71
[58] Field of Search ................................. 60/39.07, 39.181, 60/39.183, 226.1, 262, 39.43; 454/71, 76; 244/53 R, 55, 58, 60, 118.5

[56] References Cited

U.S. PATENT DOCUMENTS

| | | | |
|---|---|---|---|
| 2,391,838 | 12/1945 | Kleinhans et al. | 60/39.07 |
| 2,734,356 | 2/1956 | Kleinhans | 60/39.183 |
| 5,442,905 | 8/1995 | Claeys et al. | 60/39.07 |
| 5,482,229 | 1/1996 | Asshauer | 244/118.5 |

OTHER PUBLICATIONS

"Environmental Control Systems", Allied Signal Aerospace Company, Dec. 1989.

*Primary Examiner*—Charles G. Freay
*Attorney, Agent, or Firm*—Robert M. Schwartz

[57] ABSTRACT

The device involves the placement of an air pump turbine and the aircraft outflow valve in a duct through which all the air flows, with the turbine shaft attached to that of an electric generator, to a hydraulic pump, and to the N2 and accessory gearbox inside the engine, the air is also sent through a duct to strike inclined against the tips of the fan blades and against the tips of the first stage of the low speed compressor blades of the turbine engine.

6 Claims, 1 Drawing Sheet

AIRCRAFT AIR CONDITIONER ENERGY RECOVERY DEVICE

CROSS-REFERENCES TO RELATED APPLICATIONS

This application is a Continuation in Part of application Ser. No. 09/092,725, filed Jun. 5, 1998, now abandoned.

This application claims the priority date of Spanish Patent Application No. P9800051 filed on Jan. 14, 1998, Spanish Patent Application No. P9800246, filed on Feb. 10, 1996; and Spanish Patent Application No. P9801535, filed on Jul. 20, 1998. The basis for priority in this case is the Paris Convention for the Protection of Industrial Property (613 O.G. 23, 53 Stat 1748). The Spanish patent application was filed in The Official Patent and Trademark Office of Spain.

BACKGROUND OF THE INVENTION

1. Field of the Invention

The field of the invention is aircraft air conditioning exhaust energy recovery.

2. Description of the Prior Art

At present, aircraft air conditioning exhaust is expelled through air-flow outlet valves without taking advantage of the potential energy contained in the pressure difference of the interior of the cabin in relation to the exterior of the aircraft caused by the flow of air required for its renewal.

BRIEF DESCRIPTION OF THE INVENTION

The aircraft air conditioning energy recovery device captures the potential energy held in the pressurized cabin of an airplane flying at altitude. The pressurized cabin contains potential energy relative to the unpressurized exterior. As air exits the pressurized cabin, potential energy is converted into kinetic energy as the gas flows out. This kinetic energy can be harnessed and converted to more usable forms such as electrical energy.

The invention involves the placement of a turbine of an air pump and the aircraft outflow valve in a duct through which the air flows. The turbine shaft attached to an electric generator, a hydraulic pump, or accessory gearbox inside the engine, the turbine receives the aircraft air conditioning exhaust from the pressure cabin.

The aircraft air conditioning exhaust can be also sent through a duct to strike inclined tips of the fan blades and first stage of the low speed compressor blades of the turbine engine.

In all these cases, the engine efficiency is increased by adding the potential energy from the pressurized cabin to the system.

DETAILED DESCRIPTION OF THE PREFERRED EMBODIMENT

Figure 1:
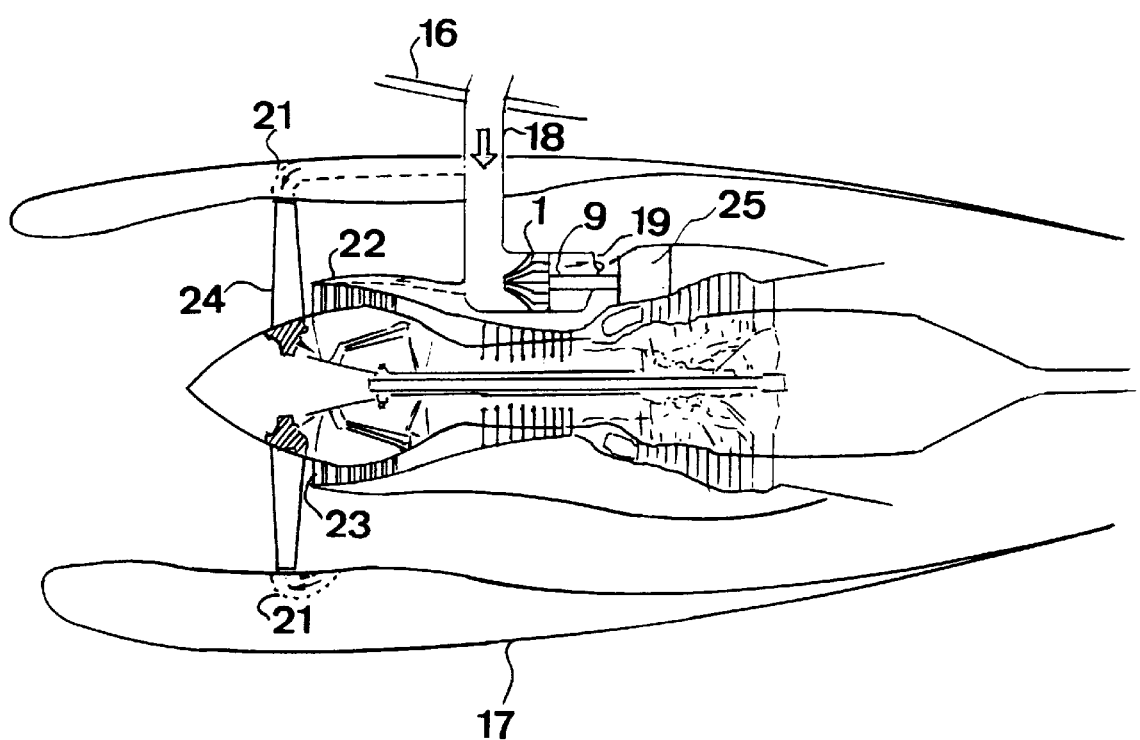
FIG. 1 shows a partial schematic cross-section view of the device of the invention.

FIG. 1 comprises the air pump turbine (1), the engine (17), the shaft of the turbine (9). Air flowing out of the pressurized cabin through duct (18) drives turbine (1) that is connected to a generator (25). This generator can be any of the following devices: an electric generator, a hydraulic pump, $N_2$, or accessory gearbox (25) via shaft (9), wherein the air outlet (19) is located. The air is also sent through ducts (21 and 21'), inside the cowl, to strike inclined tips of the fan blades (24), and through the duct (22) to strike inclined tips of the blades of the first stage of low speed compressor (23).

What is claimed is:

1. An energy recovery device in an aircraft having a turbine engine with a cowl and an air conditioned cabin with an outlet duct from said cabin, for expelling air conditioned air from said aircraft cabin comprising:

an air duct from said outlet duct to said cowl of said engine, an aircraft outflow valve in said outlet duct through which said air conditioned air flows, one or more ducts within said engine cowl to distribute within said engine said air conditioned air from said cabin, wherein said engine has fan blades, and said air conditioned air is sent through one of said ducts within said cowl to strike inclined tips of said fan blades of said turbine engine.

2. An energy recovery device in an aircraft having a turbine engine with a cowl and an air conditioned cabin with an outlet duct from said cabin, for expelling air conditioned air from said aircraft cabin comprising:

an air duct from said outlet duct to said cowl of said engine, an aircraft outflow valve in said outlet duct through which said air conditioned air flows, one or more ducts within said engine cowl to distribute within said engine said air conditioned air from said cabin, wherein said engine has low speed compressor blades, and said air conditioned air is sent through one of said ducts within said cowl to strike said low speed compressor blades of said turbine engine.

3. An energy recovery device in an aircraft having a turbine engine with a cowl and an air conditioned cabin with an outlet duct from said cabin, for expelling air conditioned air from said aircraft cabin comprising:

an air duct from said outlet duct to said cowl of said engine, an aircraft outflow valve in said outlet duct through which said air conditioned air flows, one or more ducts within said engine cowl to distribute within said engine said air conditioned air from said cabin, wherein said engine has an air pump turbine having a turbine shaft, and said air conditioned air is sent through one of said ducts within said cowl to strike said air pump turbine of said turbine engine.

4. An energy recovery device according to claim 3, wherein an electric generator is driven by said turbine shaft.

5. An energy recovery device according to claim 3, wherein said generator is connected to a hydraulic pump and an accessory gearbox inside said turbine engine.

6. An energy recovery device according to claim 3, wherein a hydraulic pump is driven by said turbine shaft.

* * * * *